United States Patent
Zhao et al.

(10) Patent No.: US 9,538,185 B2
(45) Date of Patent: Jan. 3, 2017

(54) MULTI-DESCRIPTION-BASED VIDEO ENCODING AND DECODING METHOD, DEVICE AND SYSTEM

(71) Applicant: Beijing Jiaotong University, Beijing (CN)

(72) Inventors: Yao Zhao, Beijing (CN); Huihui Bai, Beijing (CN)

(73) Assignee: Beijing Jiaotong University, Beijing (CN)

(*) Notice: Subject to any disclaimer, the term of this patent is extended or adjusted under 35 U.S.C. 154(b) by 232 days.

(21) Appl. No.: 14/385,801

(22) PCT Filed: Nov. 7, 2012

(86) PCT No.: PCT/CN2012/084204
§ 371 (c)(1),
(2) Date: Sep. 17, 2014

(87) PCT Pub. No.: WO2013/143286
PCT Pub. Date: Oct. 3, 2013

(65) Prior Publication Data
US 2015/0078434 A1    Mar. 19, 2015

(30) Foreign Application Priority Data
Mar. 30, 2012 (CN) .......................... 2012 1 0091619

(51) Int. Cl.
*H04N 7/12* (2006.01)
*H04N 19/105* (2014.01)
*H04N 19/176* (2014.01)
*H04N 19/172* (2014.01)
*H04N 19/39* (2014.01)
*H04N 19/139* (2014.01)
(Continued)

(52) U.S. Cl.
CPC .......... *H04N 19/105* (2014.11); *H04N 19/132* (2014.11); *H04N 19/137* (2014.11); *H04N 19/139* (2014.11); *H04N 19/172* (2014.11); *H04N 19/176* (2014.11); *H04N 19/39* (2014.11); *H04N 19/463* (2014.11); *H04N 19/587* (2014.11); *H04N 19/66* (2014.11)

(58) Field of Classification Search
IPC ...................................................... H04N 19/105
See application file for complete search history.

(56) References Cited

U.S. PATENT DOCUMENTS

| 2002/0116715 | A1* | 8/2002 | Apostolopoulos ...... H04L 29/06 725/86 |
| 2006/0056510 | A1* | 3/2006 | Van Der Schaar .. H04N 21/631 375/240.12 |

(Continued)

OTHER PUBLICATIONS

U.S. Appl. No. 14/369,210, filed Jun. 27, 2014, Zhao, et al.

*Primary Examiner* — Tracy Y Li
(74) *Attorney, Agent, or Firm* — Hammer & Associates, P.C.

(57) ABSTRACT

A multi-description-based video encoding and decoding method, device and system, comprising the following steps: separating odd frames from even frames to generate and encode an initial description; utilizing the correlation of macro-block levels between different descriptions to generate and encode the side information of different modes; and transmitting via a channel. The present invention may be used in a real-time video transmission scenario.

3 Claims, 4 Drawing Sheets

(51) Int. Cl.
*H04N 19/66* (2014.01)
*H04N 19/463* (2014.01)
*H04N 19/132* (2014.01)
*H04N 19/137* (2014.01)
*H04N 19/587* (2014.01)

(56) References Cited

U.S. PATENT DOCUMENTS

2008/0170615 A1* 7/2008 Sekiguchi .............. H04N 19/70
 375/240.14
2012/0044990 A1* 2/2012 Bivolarsky .......... H04N 19/105
 375/240.03

* cited by examiner

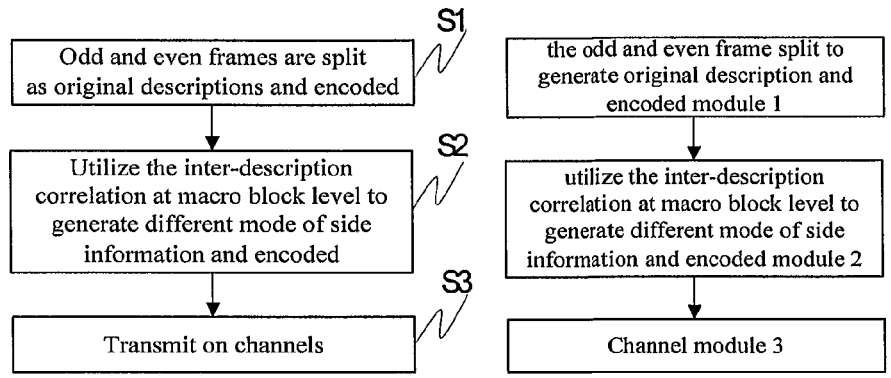
Figure 1
Figure 2
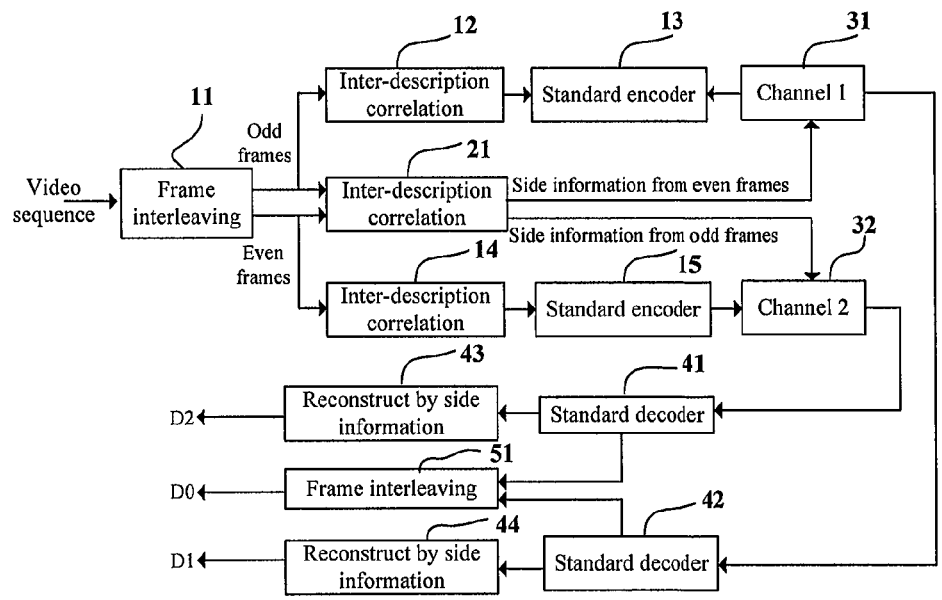
Figure 3

MULTI-DESCRIPTION-BASED VIDEO ENCODING AND DECODING METHOD, DEVICE AND SYSTEM

TECHNOLOGY FIELD

The present invention relates to the video encoding and decoding field, particularly to a multiple description based video encoding and decoding method, apparatus and system.

PRIOR ART

In recent years, with the explosive development of Internet, the applications of video transmission become more and more widely used. However, network congestion, random bit errors and packet losses may cause substantial quality degradation of the compressed video data, which impose tremendous challenge on video transmission. Especially, in real-time video transmission applications, feedback retransmission and other technologies can't meet the real-time requirements due to delay sensibility. Therefore, it is urgent to develop a video encoding and decoding system combining high compression efficiency and robust transmission.

Multiple description based coding has emerged as a promising technology for robust transmission over error-prone channels, which has been attracting more and more researchers. MDC are proposed based on the assumption that multiple channels exist between the source and destination and it is impossible for all channels to fail at the same time. The source can generate multiple bit streams (it is called descriptions) with equal priority at the encoder, which then can be transmitted over multiple channels. At the decoder, each description can be decoded independently to produce the reconstructed video sequence with an acceptable quality. With an increase in the received descriptions, the reconstructed quality can be enhanced further. In this invention, we mainly focus on MD design for two channels. In a general architecture of two channels, the distortion generated by two received descriptions is called central distortion and the distortion generated by only one received description is called side distortion.

The basic idea of MDC is to how to utilize redundant information of the descriptions to enhance robust transmission. Therefore, in MDC the essential redundancy is needed although it is possible to lead to lower compression efficiency. During the past years, the main target is to design the MDC for better tradeoff between bit rate and reconstructed quality. The classical MDC versions are using quantizers and transform. Based on the principle of MD scalar quantizer, an MD scheme for video coding is proposed in "V. A. Vaishampayan and S. John, "Balanced interframe multiple description video compression," in *Proceedings of the IEEE International Conference on Image Processing (ICIP '99)*, vol. 3, pp. 812-816, Kobe, Japan, October 1999". MD correlation transform is employed to design motion compensated MD video coding in "A. R. Reibman, H. Jafarkhani, Y. Wang, M. T. Orchard, and R. Puri, "Multiple description coding for video using motion compensated prediction," in *Proceedings of the IEEE International Conference on Image Processing (ICIP '99)*, vol. 3, pp. 837-841, Kobe, Japan, October 1999". Although the above methods have shown good performance, they are incompatible with widely-used standard codecs, such as H.26x and MPEG series. To solve this problem, in "N. Conci and F. G. B. De Natale, "Multiple description video coding using coefficients ordering and interpolation," *Signal Processing: Image Communication*, vol. 22, no. 3, pp. 252-265, 2007", MDC is designed to introduce redundancy into descriptions through utilizing the advanced video coding tools and features provided in H.264/AVC. Furthermore, many approaches are proposed for a certain standard codec such as H.264/AVC. Especially in "L. Peraldo, E. Baccaglini, E. Magli, G. Olmo, R. Ansari, Y. Yao, "Slice-level rate-distortion optimized multiple description coding for H.264/AVC," *IEEE International Conference on Acoustics Speech and Signal Processing (ICASSP '10)*, pp. 2330-2333, 2010". And "C. Lin, T. Tillo, Y. Zhao, B. Jeon, "Multiple description coding for H.264/AVC With redundancy allocation at macro block level", *IEEE Trans. on Circuits and Systems for Video Technology*, vol. 21, No. 5, pp. 589-600, 2011", in view of better performance, the MDC schemes for H.264/AVC are presented at slice and macro block (MB) level, respectively.

SUMMARY OF THE INVENTION

The object of the present invention is to provide a multiple description based video encoding and decoding method, apparatus and system, which can solve the compatibility problem in MDC.

Thus, according to the first aspect of the present invention, there provides a multiple description video coding method, characterized in that said method includes the following steps:

a video sequence can be split into odd and even frames as original descriptions and encoded;

utilize the inter-description correlation at macro block level to generate different mode of side information and encoded;

transmit on channels.

Preferably, the odd and even frames are divided to produce original descriptions and encoded, specifically odd and even frames separation, using standard coding algorithm to encode.

Preferably, the coding standard is H.264.

Preferably, the correlation of intra-description $\rho_{int\ ra}$ depends on the temporal motion-compensated correlation within the same description. It is the correlation coefficient between the current MB $B_k$ and the its forward motion-compensated MB $$B'_{k-1}, \rho_{intra}(B_k, B'_{k-1}) = \frac{Cov(B_k, B'_{k-1})}{\sqrt{D(B_k)D(B'_{k-1})}}.$$

Here $B'_{k-1}$ is the motion-compensated MB of $B_k$ in frame k−1. If $\rho_{int\ ra}(B_k, B'_{k-1}) > T_3$, the MB $B_k$ can be encoded using Skip mode.

Preferably, utilize the inter-description correlation at macro block level to generate different mode of side information and encoded. In the case of estimate the even frames by odd frames, calculate the correlation coefficients of each pair MB, $$\rho_{inter}(B_k, B^*_k) = \frac{Cov(B_k, B^*_k)}{\sqrt{D(B_k)D(B^*_k)}},$$

where $B_k$ is the current MB in even frame k and $B^*_k$ is the corresponding MB in the estimated frame k. The covariance of $B_k$ and $B^*_k$ is $Cov(B_k, B^*_k)$ and their variances can be denoted by $D(B_k)$ and $D(B^*_k)$, respectively. Next, according to the MB level correlation of inter-description, three modes of redundancy allocation will be designed as follows:

If $\rho_{int\ er}(B_k,B^*_k)>T_1$, the correlation is considered enough to normally yield good estimation for the lost MB of even frames in side reconstruction. In this case, no extra redundancy needs to be inserted, which can be regard as Mode 1.

If $T_2<\rho_{int\ er}(B_k,B^*_k)\leq T_2$, it is difficult for the method of MCI to estimate the accurate motion vector. Therefore, the real motion vector for this MB of even frames can be regarded as the essential side information, which is Mode 2. It is noted that such motion vector can be searched in the odd frames. Here we use bi-directional motion estimation.

If $\rho_{int\ er}(B_k,B^*_k)<T_2$, some large irregular motion may occur and more side information is needed for good estimation, in this case, besides the motion vectors like Mode 2, the corresponding residuals are also needed as the side information, this can be considered as Mode 3;

Odd frame can be estimate by even frame, which is the same with the above even frame estimation by odd frame.

According to the second aspect of the present invention, there provides a multiple description based video encoding apparatus, including the following modules:

a module in which odd and even frame split and generate original description for splitting the original video sequence into two description by odd and even frames, calculating the intra-description correlation and then encoding by standard encoder;

a module in which the inter-description correlation at macro block level is utilized to generate different mode of side information and encoded module for calculating the inter-description correlation, generating different mode of side information and encoding; and a channel module for transmitting the signal after encoding.

According to the third aspect of the present invention, there provides a multiple description video decoding method. If both channels work, the received two bit rate streams will be decoded to generate two video sub-sequences which then can be interleaved for central reconstruction; If only one channel works, the side decoder is designed to estimate the lost information according to the different modes. In the case of Mode 1, the lost frames can be reconstructed using the method of MCI directly. Here, the method of MCI is performed by bi-directional motion estimation. We denote by f the estimated frame between frame $f_k$ and frame $f_{k+1}$ and by $MV(\vec{p})$ the motion vector for the pixel moving location. To avoid the holes in the estimated frame, we can compute a preliminary reconstruction as background.

$$f(\vec{p}) = \frac{1}{2}(f_k(\vec{p}) + f_{k+1}(\vec{p})).$$

Furthermore, the forward and backward motion compensation can be performed for frame $f_{k+1}$ and $f_k$, respectively. In order to solve the overlapped problem of MCI, the mean values of overlapped pixels are adopted for motion compensation. Then the preliminary background may be replaced with the MCI-based reconstruction according to such a formula as $$f(\vec{p}) = \frac{1}{2}\left(f_k\left(\vec{p} - \frac{1}{2}MV(\vec{p})\right) + f_{k+1}(\vec{p}) + \frac{1}{2}MV(\vec{p})\right).$$

In the case of Mode 2 and Mode 3, side information such as motion vectors and residuals can be applied to refine the reconstructed quality of MCI.

According to the fourth aspect of the present invention, there provides a multiple description video decoding apparatus, including:

standard decoder for decoding;

utilizing side information to reconstruct, for reconstructing the odd and even frames;

frame-interleaving, for interleaving odd and even frames.

According to the fifth aspect of the present invention, there provides a multiple description based video encoding and decoding system, including the multiple description encoding and decoding apparatus.

The redundancy from inter- and intra-descriptions is effectively allocated to gain better tradeoff between compression efficiency and robust transmission. For simplicity, at the encoder odd/even frame splitting can be performed firstly to generate the video sub-sequence as the original descriptions, which can ensure fully compatibility with the current standard source encoder such as H.26x or MPEG series. Then the correlation of inter-description at MB level is applied to produce side information of different modes. At the decoder the side information is helpful to estimate the loss information for better side decoding quality. Furthermore, in view of higher compression efficiency, the flexible skip mode is employed to adapt the MB level correlation of intra-description.

BRIEF DESCRIPTION OF ACCOMPANYING DRAWINGS

Through the following description with the appended figures, it can be easy to understand the present invention, as well as its advantages. But the included figures are used to further understand the present invention, they belong to a part of the present invention. It is used to describe the invention and the present invention is not limited to these figures alone.

FIG. 1 is a schematic view of an encoding method flowchart;

FIG. 2 is a schematic view of an encoding apparatus block diagram;

FIG. 3 is a schematic view of a system block diagram;

Figure 4A:
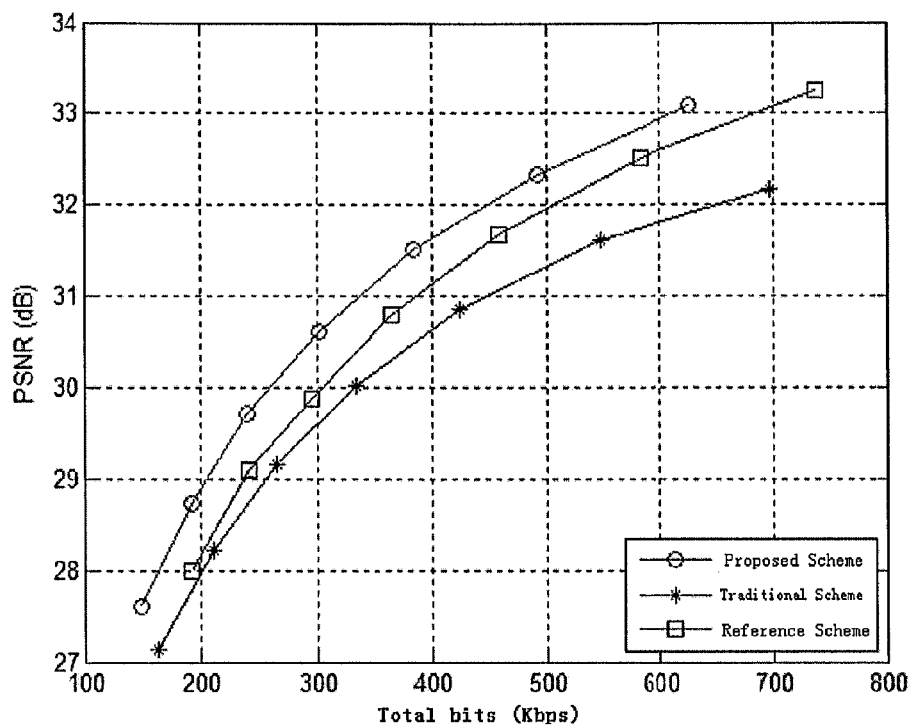
Figure 4B:
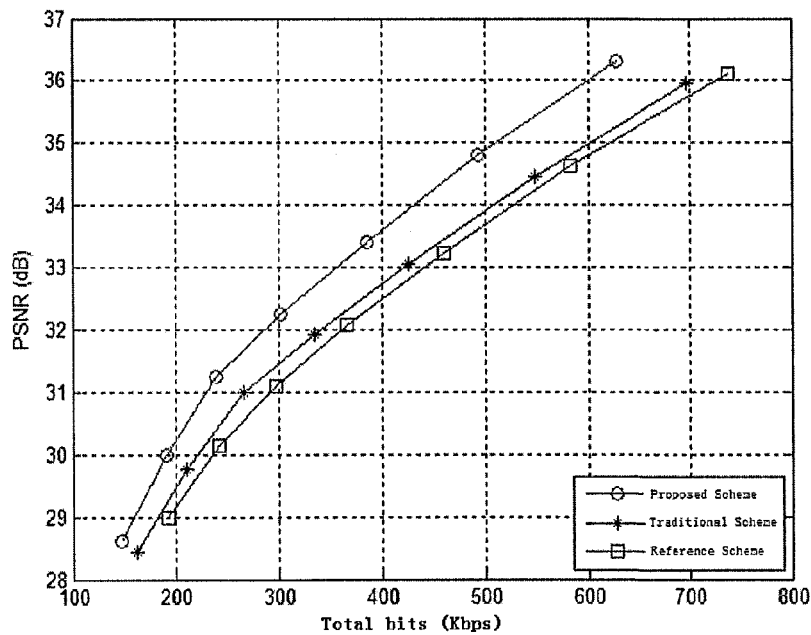
Figure 5A:
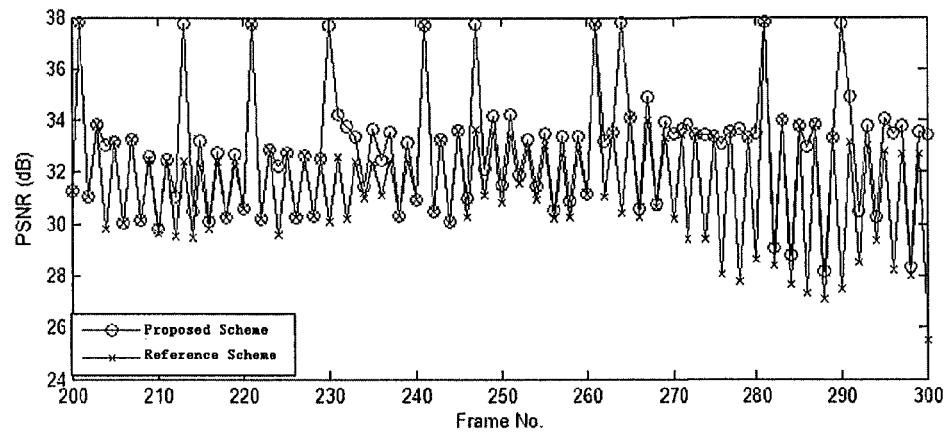
Figure 5B:
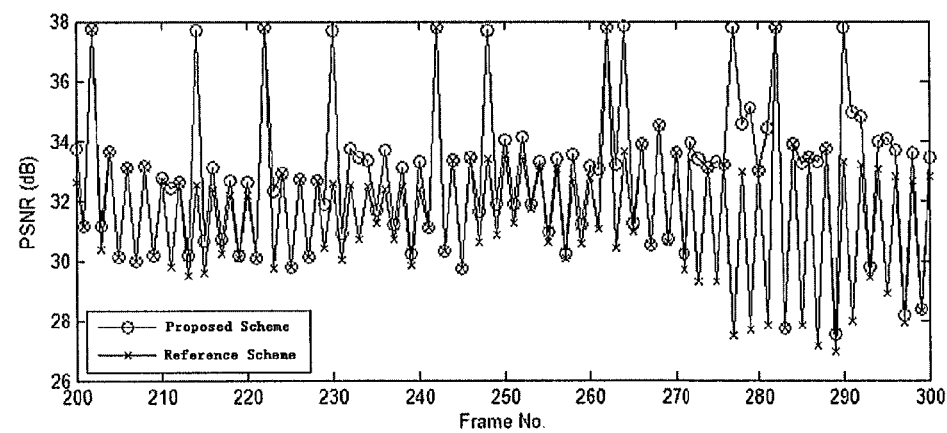
Figure 6:
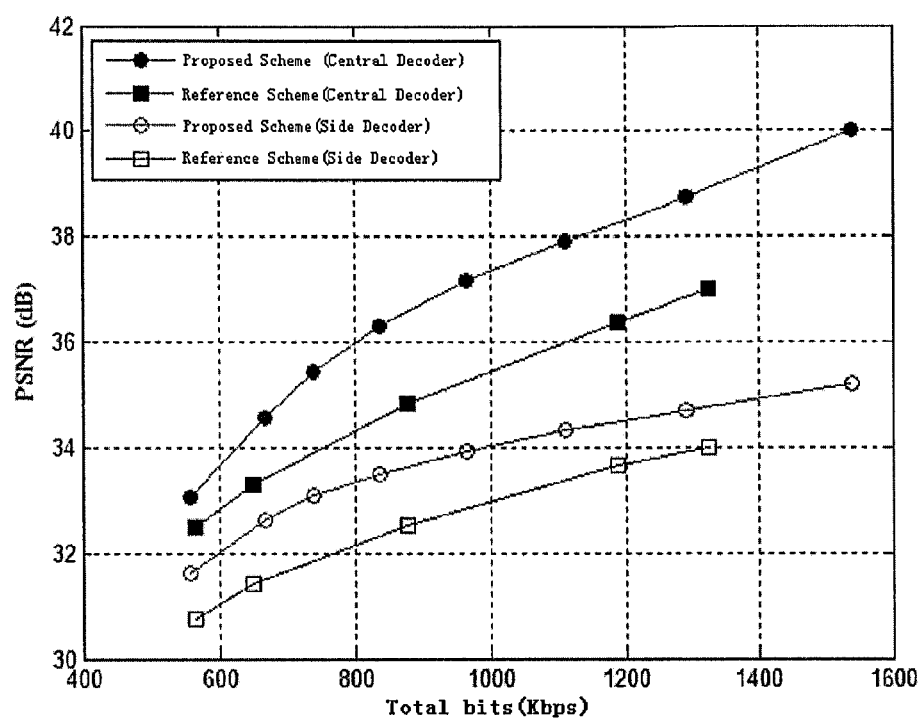

FIG. 4(a) and FIG. 4(b) are a schematic view of performance comparison of the sequence "Mobile.qcif";

FIG. 5(a) and FIG. 5(b) are a schematic view of performance comparison of side reconstruction for each frame; and FIG. 6 is a schematic view of performance comparison of the sequence "Paris.cif";

BEST MODE FOR CARRYING OUT THE PRESENT INVENTION

In the following, embodiments of the present invention will be described with FIGS. 1-6.

To make the above object, features and advantages to be more obvious and easy to be understood, the present invention will be further explained with the figures.

Example 1

As is shown in FIG. 1, a multiple description based video encoding and decoding method is including following steps:

S1, odd and even frames are split as original descriptions and encoded;

S2, the inter-description correlation at macro block level is utilized to generate different mode of side information and encoded; and S3, channel transmission.

Example 2

As is shown in FIG. 2, a multiple description based video encoding and decoding apparatus is including following modules:

the module 1 in which odd and even frame are split and generate original description, for splitting the original video sequence into two description by odd and even frames, calculating the intra-description correlation and then coding by standard encoder;

the module 2 in which the inter-description correlation at macro block level is utilized to generate different mode of side information and encoded, for calculating the inter-description correlation, generating different mode of side information and coding.

The channel module 3, for transmitting the signal after encoding.

Example 3

As is shown in FIG. 3, a multiple description based video encoding and decoding system:

Step 1. Frame Splitting

For simplicity, the original video sequence can be split into odd and even frames 11, which is fully compatible with the current standard video codec. Here, the two sub-sequences, that is, odd frames and even frames can be regarded as the original descriptions. Furthermore, the original video sequences can be sub-sampling in temporal domain to generate multiple descriptions. Here, we focus on the two descriptions.

Step 2. Side Information Generated

If only odd or even frames can be received, the side reconstruction may suffer a substantial distortion loss due to the wrong estimation for the block displacement. Therefore, for better estimation side information will be generated using MB level inter-description correlation 21. Here, take an example of odd frames. Our task is to produce some useful side information from even frames at the decoder.

Firstly, at encoder odd frames can be utilized to estimate the even frames according to MCI (motion-compensated interpolation). The process is similar with the estimation at the side decoder. The MCI method will be presented in Step 5. Each MB of the reconstructed frames will be compared with the same position MB in the real even frames. Thus we can calculate the correlation coefficients of each pair MB using the equation (1).

$$\rho_{inter}(B_k, B_k^*) = \frac{\text{Cov}(B_k, B_k^*)}{\sqrt{D(B_k)D(B_k^*)}}, \quad (1)$$

Where $B_k$ is the current MB in even frame k and $B^*_k$ is the corresponding MB in the estimated frame k. The covariance of $B_k$ and $B^*_k$ is $\text{Cov}(B_k, B^*_k)$ and their variances can be denoted by $D(B_k)$ and $D(B^*_k)$, respectively.

Next, according to the MB level correlation of inter-description, three modes of redundancy allocation will be designed as follows:

If $\rho_{int\ er}(B_k, B^*_k) > T_1$, the correlation is considered enough to normally yield good estimation for the lost MB of even frames in side reconstruction. In this case, no extra redundancy needs to be inserted, which can be regard as Mode 1.

If $T_2 < \rho_{int\ er}(B_k, B^*_k) \geq T_1$, it is difficult for the method of MCI to estimate the accurate motion vector, therefore, the real motion vector for this MB of even frames can be regarded as the essential side information, which is Mode 2. Here we use bi-directional motion estimation.

If $\rho_{int\ er}(B_k, B^*_k) > T_2$, some large irregular motion may occur and more side information is needed for good estimation, in this case, besides the motion vectors like Mode 2, the corresponding residuals are also needed as the side information, this can be considered as Mode 3;

The side information will also be transmitted over the corresponding channels.

Step 3. Adaptive Skip Mode

In Step 2, the introduced redundancy may impact the compression efficiency. Therefore, the redundancy within each description should be removed effectively. In this invention, a flexible skip mode is designed which can make good use of the MB level correlation of intra-descriptions 12, 14. The correlation of intra-description (denoted by $\rho_{int\ ra}$) is dependent on the temporal motion-compensated correlation within the same description. Therefore, $\rho_{int\ ra}$ between the current MB $B_k$ and the its forward motion-compensated MB $B'_{k-1}$, $$\rho_{intra}(B_k, B'_{k-1}) = \frac{\text{Cov}(B_k, B'_{k-1})}{\sqrt{D(B_k)D(B'_{k-1})}}, \quad (2)$$

$B'_{k-1}$ is the motion-compensated MB of $B_k$ in frame k−1.

If $\rho_{int\ ra}(B_k, B'_{k-1}) > T_3$, the MB $B_k$ can be encoded using Skip mode. As a result, the flexible skip mode can adapt to the correlation within the same descriptions. Compared with the uniform period of Skip mode, adaptive Skip mode can keep up with the temporal correlation between frames, so that better error concealment can be achieved at the decoder if information loss occurs in descriptions.

Step 4. Standard Encoder

Each video sequence can be encoded to bit streams using current standard codec 13, 15. Here, H.264 encoder is chosen and obviously the proposed scheme is compatible with the generalized standard encoder. In addition, the residuals generated in Mode 3 also can be processed using intra-coding of H.264 for compression.

Transmission in channels 31, 32.

Step 5. Reconstruction at the Decoder

Here, two cases for decoding will be considered, that is the design of central decoder and side decoder.

Firstly, the stream is decoded by the standard decoder 41, 42, then the side information is utilized to restructure 43, 44, and frame interleaving 51 to reconstruct the video signal. If both channels work, the received two bit rate streams will be decoded to generate two video sub-sequences which then can be interleaved for central reconstruction. Due to the MB level correlation of intra-descriptions, adaptive Skip mode will counteract some effect from the redundant side information. Therefore, the compression performance will not drop seriously with increasing redundancy.

If only one channel works, the side decoder is designed to estimate the lost information according to the different modes. In the case of Mode 1, the lost frames can be reconstructed using the method of MCI directly. The widely-used method of MCI is performed by bi-directional motion estimation, which may produce overlapped pixels and holes in the reconstructed frame. We denote by f the estimated frame between frame $f_k$ and frame $f_{k+1}$ and by $MV(\vec{p})$ the motion vector for the pixel moving location. To avoid the holes in the estimated frame, we can compute a preliminary reconstruction as background.

$$f(\vec{p}) = \frac{1}{2}(f_k(\vec{p}) + f_{k+1}(\vec{p})) \quad (3)$$

Furthermore, the forward and backward motion compensation can be performed for frame $f_{k+1}$ and $f_k$, respectively. To solve the overlapped problem of MCI, the mean values of overlapped pixels are adopted for motion compensation. Then the preliminary background may be replaced by the MCI-based reconstruction according to $$f(\vec{p}) = \frac{1}{2}\left(f_k\left(\vec{p} - \frac{1}{2}MV(\vec{p})\right) + f_{k+1}(\vec{p}) + \frac{1}{2}MV(\vec{p})\right) \quad (4)$$

In the case of Mode 2 and Mode 3, side information such as motion vectors and residuals can be applied to refine the reconstructed quality of MCI.

Example 4

Two standard video sequences "Mobile.qcif" and "Paris.cif" are used to test our scheme against others. To make a fair comparison, the same experimental setup is applied for all the compared schemes. The same parameters are chosen in H.264 encoder and decoder. Additionally, we also employ the same MCI method for the estimation of lost frames. It is noted that the total bit rate is the sum of two descriptions with the labels and the side distortion is the mean PSNR value from two side decoders.

FIG. 4a and FIG. 4b show the side and central distortion of the proposed scheme against other three relevant schemes for the test video "Mobile.qcif" at the total bit rate from 100 kbps to 800 kbps. Here, the conventional method is the method without any pre-processing. Due to the direct frame splitting, the conventional method has the worst side reconstruction shown in FIG. 4a. Additionally, the reference scheme is redundancy allocation at frame level in "H. Bai, Y. Zhao, C. Zhu, A. Wang, "Multiple description video coding using joint frame duplication/interpolation," Computing and Informatics, vol. 29, pp. 1267-1282, 2010". The redundancy allocation in it is at frame level which leads to lower central reconstruction shown in FIG. 4b. From the figures, at the same bit rate the proposed scheme can consistently perform better than the other scheme in both side and central distortion. This is just a comparison for the average PSNR values of the whole video. Actually, some individual frames in the proposed scheme may achieve more improvements. FIG. 5a and FIG. 5b show the side PSNR of each frame (from the 200th to 300th frame) at the total bit rate 400 kbps achieved by the proposed scheme and the reference scheme. It can be seen that for either channel the side reconstruction of the proposed scheme has substantial improvement compared with the reference scheme and the maximal improvement is about 10 dB at the 290th frame.

In FIG. 6, the test video "Paris.cif" is utilized for examining the proposed scheme at the total bit rate from 400 kbps to 1800 kbps. From the results, we can find out that our proposed temporal sampling scheme out performs the other schemes with 0.5-1.7 dB in side distortion and 0.5-1 dB in central distortion.

As mentioned above, the specific implementation way of present invention has been described. But for those skilled in the art, the implementations above are only examples. The technical personnel in the field can omit, replace and change the details of above method and system on the premise that do not go beyond the spirits from the essence of the present invention. For example, combined with the above method steps, perform essentially the same function to achieve essentially the same results by essentially the same method, belong to the scope of this invention. Hence, any modified embodiments should also be protected in the present invention

The invention claimed is:

1. A multiple description based video encoding system comprises:
   a module for splitting the original video sequence into two odd and even frame descriptions and calculating an intra-description correlation of the odd and even frames, respectively, and then coding the descriptions with a standard encoder;
   a module for calculating the inter-description correlation, generating different modes of side information, and coding the side information, wherein the inter-description correlation at a macro block level is used to generate different modes of side information; and
   a channel module for transmitting signals after encoding, wherein the intra-description correlation ($\rho_{intra}$) depends on a motion-compensated coefficient of correlation within the same description and between a current macro-block (MB) $B_k$ and a motion-compensated MB $$B'_{k-1}, \rho_{intra}(B_k, B'_{k-1}) = \frac{Cov(B_k, B'_{k-1})}{\sqrt{D(B_k)D(B'_{k-1})}},$$

where, $B'_{k-1}$ is the motion-compensated MB of $B_k$ in frame k−1, if $\rho_{intra}(B_k, B'_{k-1}) > T_3$, the MB $B_k$ is encoded using a skip mode.

2. A multiple description based video encoding system comprises:
   a module for splitting the original video sequence into two odd and even frame descriptions and calculating an intra-description correlation of the odd and even frames, respectively, and then coding the descriptions with a standard encoder;
   a module for calculating the inter-description correlation, generating different modes of side information and coding the side information, wherein the inter-description correlation at a macro block level is used to generate different modes of side information; and
   a channel module for transmitting signals after encoding, wherein in a case of estimating the even frames by means of odd frames, a correlation coefficient of each pair of MBs (macro blocks) is calculated with a formula $$\rho_{inter}(B_k, B_k^*) = \frac{Cov(B_k, B_k^*)}{\sqrt{D(B_k)D(B_k^*)}},$$

where $B_k$ is a current MB in even frame k and $B^*_k$ is a corresponding MB in an estimated frame k, a covariance of $B_k$ and $B^*_k$ is $Cov(B_k,B^*_k)$ and the variances are denoted by $D(B_k)$ and $D(B^*_k)$, respectively;

next, according to the MB level correlation inter-description coefficient, three modes of redundancy allocation are designed as follows:
1) if $\rho_{int\_er}(B_k,B^*_k) > T_1$, the correlation is enough to normally yield good estimation for a lost MB of even frames in a side reconstruction, and no extra redundancy needs to be inserted (Mode 1);
2) if $T_2 < \rho_{int\_er}(B_k,B^*_k) \leq T_1$, a real motion vector for the MB of even frames is the essential side information (Mode 2), where a bi-directional motion estimation is used to find a motion vector in the odd frames;
3) if $\rho_{int\_er}(B_k,B^*_k) < T_2$, the motion vectors of Mode 2, and corresponding residuals are the side information (Mode 3);

estimating odd frames by even frames corresponds with estimating even frames by odd ones.

3. A multiple description based video decoding system comprises:
if both channels work normally, the received two bit rate streams are decoded to generate two video sub-sequences which are then interleaved for central reconstruction;
if only one channel works normally, a side decoder is designed to estimate lost information according to the different modes;
Mode 1, lost frames are reconstructed using motion-compensated interpolation (MCI), directly, where, the MCI is performed by a bi-directional motion estimation, where f is an estimated frame between frame $f_k$ and frame $f_{k+1}$ and $MV(\vec{p})$ is a motion vector for a pixel moving location, to avoid holes in the estimated frame, a preliminary reconstruction is made as a background with a computation, $$f(\vec{p}) = \frac{1}{2}(f_k(\vec{p}) + f_{k+1}(\vec{p})),$$

forward and backward motion compensations are performed for frame $f_{k+1}$ and $f_k$, respectively, in order to solve an overlapped problem of MCI, mean values of overlapped pixels are adopted for motion compensations, then the preliminary reconstruction is replaced with the MCI-based reconstruction according to $$f(\vec{p}) = \frac{1}{2}\left(f_k\left(\vec{p} - \frac{1}{2}MV(\vec{p})\right) + f_{k+1}(\vec{p}) + \frac{1}{2}MV(\vec{p})\right);$$

Mode 2 and Mode 3, side information such as motion vectors and residuals are applied to refine the reconstructed quality of MCI, the side information is motion vectors and residuals.

* * * * *